US011920374B2

(12) United States Patent
Bowley

(10) Patent No.: US 11,920,374 B2
(45) Date of Patent: Mar. 5, 2024

(54) HIGH SECURITY LOCK WITH SLIDER TO ISOLATE LOCK PINS FROM CYLINDER APPLIED TORQUE

(71) Applicant: Ryan Thomas Bowley, Calgary (CA)

(72) Inventor: Ryan Thomas Bowley, Calgary (CA)

(*) Notice: Subject to any disclaimer, the term of this patent is extended or adjusted under 35 U.S.C. 154(b) by 260 days.

(21) Appl. No.: 17/318,164

(22) Filed: May 12, 2021

(65) Prior Publication Data

US 2021/0355709 A1 Nov. 18, 2021

Related U.S. Application Data

(60) Provisional application No. 63/024,081, filed on May 13, 2020.

(51) Int. Cl.
*E05B 27/00* (2006.01)

(52) U.S. Cl.
CPC ...... *E05B 27/0075* (2013.01); *E05B 27/0017* (2013.01); *E05B 27/0042* (2013.01); *E05B 27/0057* (2013.01); *E05B 27/0082* (2013.01); *E05B 2027/0025* (2013.01)

(58) Field of Classification Search
CPC ............... E05B 27/001; E05B 27/0017; E05B 27/0042; E05B 27/0057; E05B 27/0067; E05B 27/0075; E05B 27/0082; E05B 2027/0025
See application file for complete search history.

(56) References Cited

U.S. PATENT DOCUMENTS

| | | | | | |
|---|---|---|---|---|---|
| 1,455,577 | A * | 5/1923 | Epstein | E05B 27/0067 | 70/DIG. 37 |
| 2,287,175 | A * | 6/1942 | Heyer | E05B 27/0082 | 70/495 |
| 2,391,832 | A * | 12/1945 | Johnstone | E05B 9/084 | 70/367 |
| 3,987,654 | A * | 10/1976 | Iaccino | E05B 27/0082 | 70/494 |
| RE30,198 | E * | 1/1980 | Oliver | E05B 27/0082 | 70/494 |
| 4,732,022 | A * | 3/1988 | Oliver | E05B 27/0082 | 70/494 |
| 5,752,400 | A * | 5/1998 | Kim | E05B 9/084 | 70/411 |
| 6,889,534 | B2 * | 5/2005 | Koluch | E05B 27/001 | 70/338 |

(Continued)

*Primary Examiner* — Christopher J Boswell
(74) *Attorney, Agent, or Firm* — Ryan W. Dupuis; Kyle R. Satterthwaite; Ade & Company

(57) ABSTRACT

A locking system uses a lock housing, a lock cylinder for rotation in the lock housing, pins to control the lock cylinder being in unlocked or locked states relative to the lock housing, and a key to control the position of the pins. The system further includes a slider or lock bar within the lock housing. The slider moves relative to the lock cylinder and the lock housing between (i) a cylinder locking position blocking rotation of the lock cylinder relative to the lock housing so as to isolate the pins from the torque applied to the lock cylinder while allowing the pins to be displaced between the locked and unlocked positions thereof and (ii) a pin locking position of the slider in which the pins are resisted from movement relative to the lock housing and the lock cylinder while rotation of the lock cylinder is uninhibited by the slider.

7 Claims, 5 Drawing Sheets

(56) References Cited

U.S. PATENT DOCUMENTS

| | | | | |
|---|---|---|---|---|
| 7,775,074 B1 * | 8/2010 | Tobias | ................ | E05B 27/0017 70/494 |
| 8,720,241 B1 * | 5/2014 | Widen | ................ | E05B 27/0082 70/494 |
| 10,472,856 B1 * | 11/2019 | Widén | ................ | E05B 27/0017 |
| 2023/0038968 A1 * | 2/2023 | Magill | ................ | E05B 27/0017 |

* cited by examiner

HIGH SECURITY LOCK WITH SLIDER TO ISOLATE LOCK PINS FROM CYLINDER APPLIED TORQUE

This application claims the benefit under 35 U.S.C. 119(e) of U.S. provisional application Ser. No. 63/024,081, filed May 13, 2020.

FIELD OF THE INVENTION

The present invention relates to security locks for the purpose of controlling entry to doorways, padlocks, safes, automobiles and the like. More particularly, the present invention relates to a locking system in which the pins are isolated from the torque applied to the lock cylinder while the pins remain movable between locked and unlocked positions.

BACKGROUND

Embodiments relate generally to security locks and keys for the purpose of controlling entry to doorways, padlocks, safes, automobiles and the like. More particularly, embodiments may relate to anti pick or pick proof high security locking systems.

Currently, general security locks and keys may be susceptible to tampering and may easily be overcome. This may lead to unauthorized access to potentially sensitive areas secured by locks and keys. This is generally due to their nature, in that the lock pins can be manipulated by tools that enter the keyway while torque is being applied to the lock core. The combination of using torque to bind the pins and tools to set the pin heights is the basis of many lock picking attacks. The invention herein presents a system that offers two discrete system states; the first being that a lock bar is locking the core from turning so that the pins can not be bound due to applied torque on the lock and subsequent turning of the core. The second state is that this locking bar is actuated by the key a distance where the lock cylinder is freed and torque can be applied to it but in doing so the lock bar has locked the pins in their current position. This causes a binary situation where the pins are free to be manipulated but they can not be bound using torque or you can apply torque but you cannot manipulate the pins making manipulation not possible in practices currently used.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

According to one aspect of the invention there is provided a high security locking system comprising:

a key;

a lock housing;

a lock cylinder supported by the lock housing for rotation about a lock axis responsive to a torque applied to the lock cylinder;

a plurality of pins operatively associated with the lock housing and the lock cylinder for engagement by the key when the key is inserted into the lock housing for movement of the pins relative to the lock cylinder and the lock housing between a locked position blocking rotation of the lock cylinder relative to the lock housing and an unlocked position in which rotation of the lock cylinder relative to the lock housing is uninhibited by the pins; and a slider operatively associated with the lock housing and the lock cylinder for movement relative to the lock cylinder and the lock housing between a cylinder locking position of the slider blocking rotation of the lock cylinder relative to the lock housing so as to isolate the pins from the torque applied to the lock cylinder while allowing the pins to be displaced between the locked and unlocked positions thereof and a pin locking position of the slider in which the pins are resisted from movement relative to the lock housing and the lock cylinder by the slider while rotation of the lock cylinder relative to the lock housing is uninhibited by the slider.

Preferably the slider occupies an intermediate position as the slider is displaced between the cylinder locking position and the pin locking position in which (i) the slider blocks rotation of the lock cylinder relative to the lock housing so as to isolate the pins from the torque applied to the lock cylinder and (ii) the pins are resisted from movement relative to the lock housing and the lock cylinder by the slider in the intermediate position, whereby the pins are resisted from movement prior to the rotation of the lock cylinder being uninhibited by the slider as the slider is displaced from the cylinder locking position to the pin locking position.

Preferably the slider is slidable relative to the lock cylinder along an axis oriented parallel to the lock axis.

Preferably the slider includes a first interlocking feature and the pins include a second interlocking feature arranged for interlocking with one another in the pin locking position.

Preferably the slider is movable relative to the lock cylinder from the cylinder locking position to the pin locking position responsive to insertion of a key into the lock housing.

According to a second aspect of the present invention there is provided a high security locking system comprising:

a key;

a lock housing, wherein the lock housing comprises of a torque capable feature which couples and uncouples with a slider under translation along the axis; and a lock cylinder disposed within the lock housing, comprising of a recessed pathway in the direction of the axis of rotation which guides a slider and provides a torque capable coupling along the entire translation of the slider.

Preferably the system is further arranged such that: (i) the slider is movable to translate due to communication with the key, guided by a recessed path in the cylinder; (ii) the recessed path provides a torsional coupling mechanism from the slider to the cylinder; (iii) the slider is slidable relative to the housing; and (iv) the sliding has features which when in certain positions of the sliding movement relative to the housing can engage with and lock the pins at their current position.

Preferably the system further includes a set of pins, wherein the pins have serrated features thereon to allow the slider to engage and couple with the pins and lock their movement at their current position.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 2B:
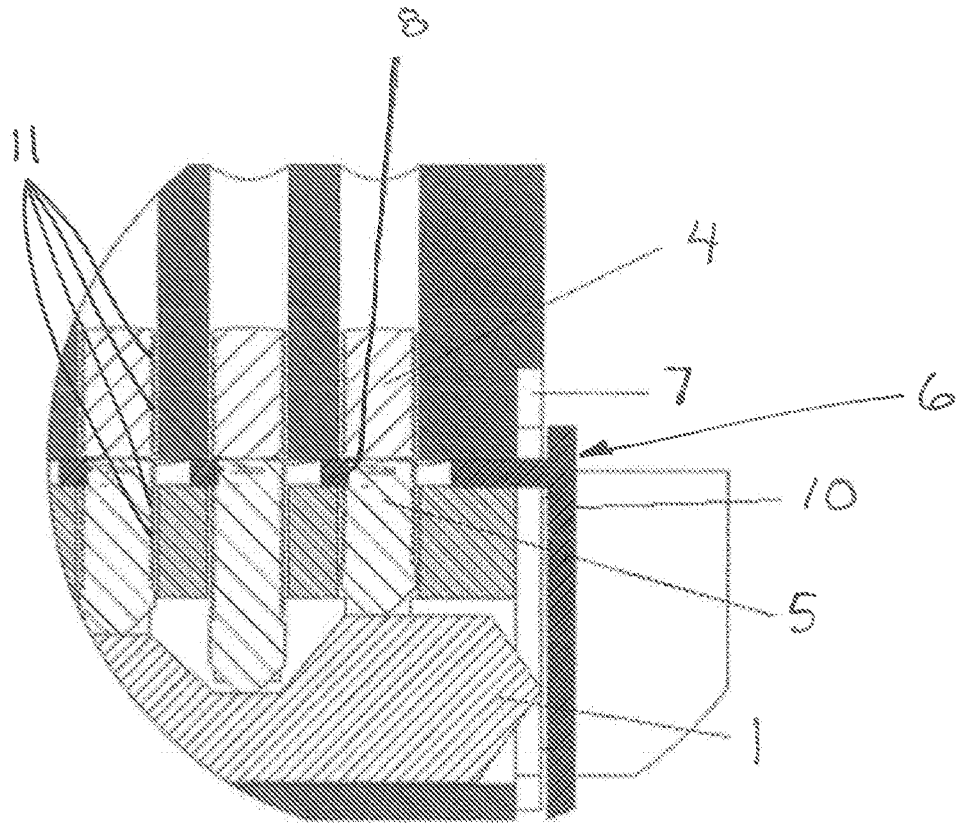
FIGS. 2A and 2B illustrate cross section and detail views of the high security locking system of FIG. 1 where the torque is now in an unlocked position and the pins are in a locked state.
Figure 2A:
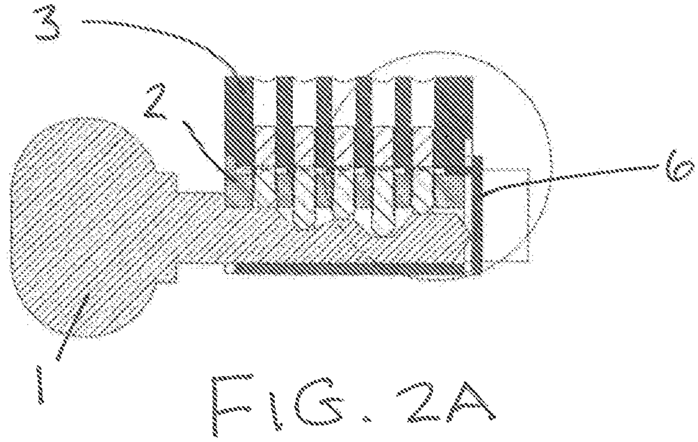

The disclosed embodiments recite a high security locking system, where the lock core and lock pins are both in communication with a locking bar. The bar is capable of putting both the lock cylinder and the lock pins in one of two discrete states; locked or free. When the bar is untouched by a key or lock tools it is axially in one position in the lock. In the embodiment shown that would be towards the outside or front face of the lock. In this position the locking bar is locking the core with a feature that couples the lock cylinder to the lock housing. The feature shown in this embodiment is a rectangular tab that protrudes off the locking bar. It is understood by the inventor that the actual shape and location of this coupling feature is rather trivial and could be moved inside the bore of the housing, to the front of the lock, etc. and be of different generally shapes without changing the intent and function of the feature which is to lock the core to the housing until the bar has traveled a set distance and then free the core. In the industry this is known as a slider element but in general this slider is not responsible for a second function. In this lock when that slider has been actuated on and has travelled a prescribed distance that is necessary to uncouple the lock cylinder from the lock housing elements on the slider itself have already trapped the pins from being able to move. In this embodiment the slider has a thread like feature that is inserted into serrations on the pins in which the thread-like feature 8 defines a first interlocking feature on the slider and the serrations 11 define a plurality of second locking features spaced apart from one another along a length of each pin as best shown in FIGS. 2A and 2B. This thread like or sharp-edged feature 8 will be well into a corresponding one of the serrations 11 of the pin before the torque is uncoupled from the coupling feature and will not be removed from the serration until the coupling feature is back into position to create to two discrete states of the lock. It should also be noted that the locking bar or sliding element is shown as acting across the top of the lock cylinder, is flat, and encompasses the pins in a symmetrical manner. However, this locking bar could easily be placed beside the pin stacks on either side, in the lock housing and several other areas that would satisfy the same purpose while not being different in concept. The locking bar shown is simply the preferred embodiment at the time of conception from a manufacturing perspective. The lock and pins can never both be in the free state at the same time. They can both be in the locked state but in general are in opposite states.

Figure 1:
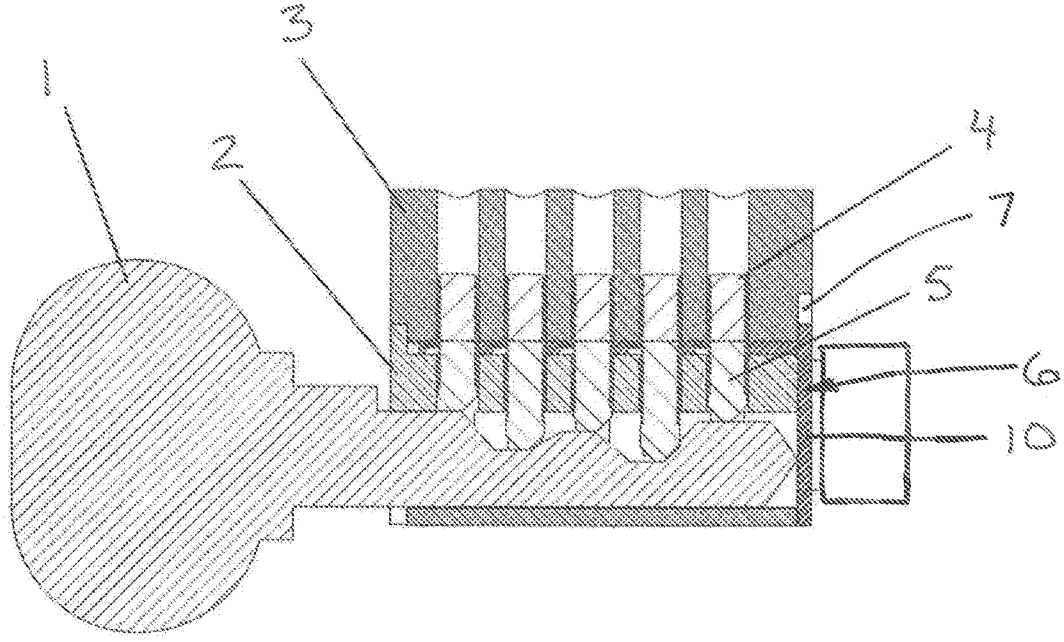
FIG. 1 illustrates a cross section view of a high security locking system in a torque locked state but the pins are in a free state.

FIG. 1 illustrates an embodiment of a high security locking system. Item 1 is a very standard key with no special features other than an exact length and proper biting. Item 2 is the lock cylinder which is the component of the lock that is unlocked or locked by the keys in order to operate the rest of the lock mechanism not shown in the drawings. Item 3 is the lock housing or the stationary part of a lock that houses the parts and mechanisms. Item 4 is the top pins or driver pins that are generally acted upon by springs not shown in the drawings. Item 5 are the key pins and item 6 is the locking bar. In this figure the key 1 has been pushed in far enough to where the bottom pins 5 have been set to their proper depth but the locking bar 6 has not been actuated by the key 1. In this state the locking bar 6 is solely locking the cylinder 2 to the housing 3.

FIGS. 2A and 2B illustrate the high security locking system according to the first embodiment of FIG. 1 wherein the key 1 has continued to enter the cylinder 2 and has actuated the locking bar 6 and the locking bar is no longer coupled with the pocket 7 in the housing. The cylinder 2 is now free to rotate in the housing 3 if the pins are in the proper height. The protruding threads or locking features 8 on the lock bar 6 are now trapping the pins 5 so that if the pins 5 are not at the right height, then they would be locking the cylinder 3 but cannot be adjusted further because they are locked by the locking features 8 on the lock bar 6

Figure 3:
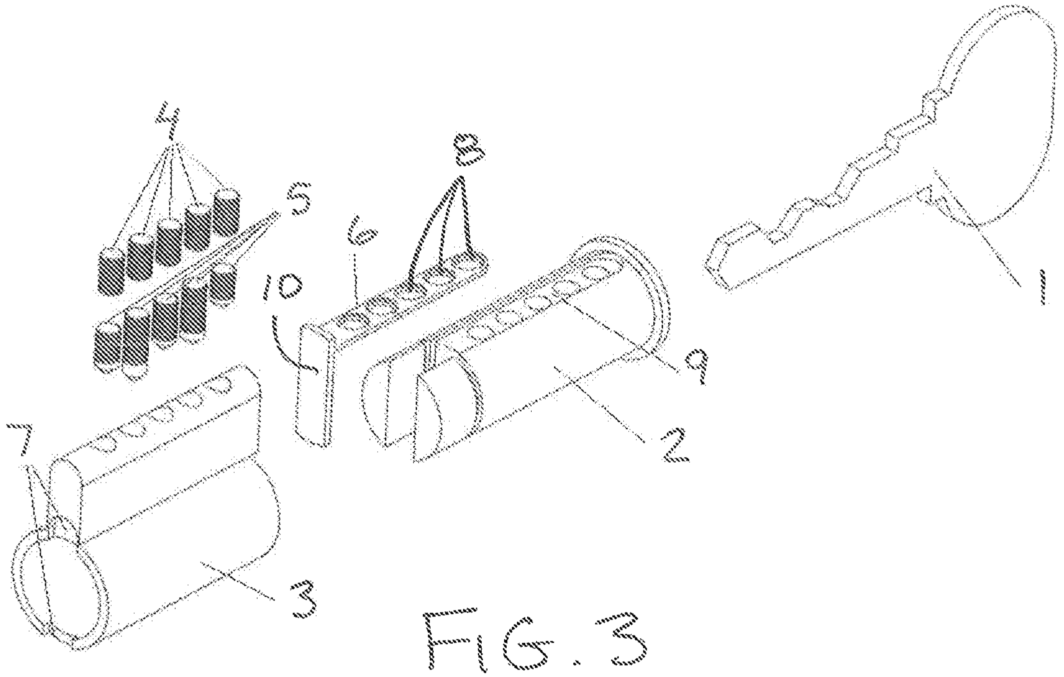
FIG. 3 illustrates an exploded view of the components.

FIG. 3 illustrates the high security locking according to the first embodiment of FIG. 1 in an exploded view to clarify how the components interact. Of note and what may not be clear in other views is the guide way 9 in which the lock bar 6 is able to translate in. Also of note is the pocket 7 in which the lock bar 6 is coupled to when in its forward or coupled position.

Figure 4:
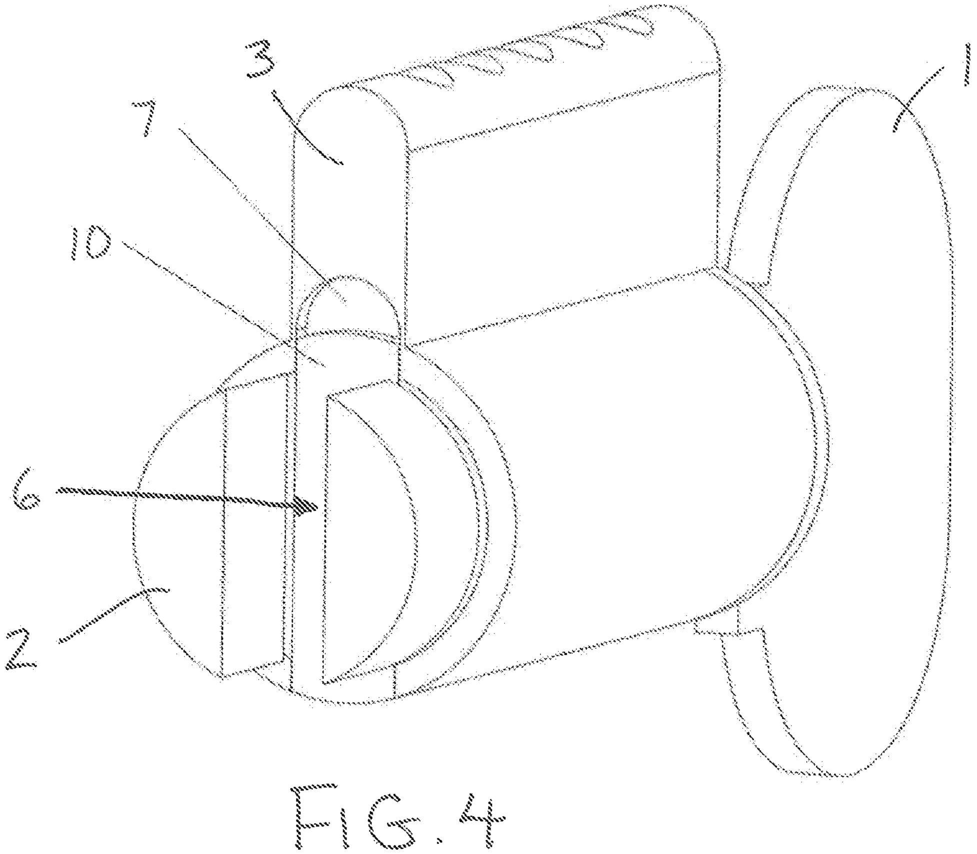
FIG. 4 illustrates the core locking mechanism in a rear isometric view in a locked state.

FIG. 4 illustrates the high security locking according to the first embodiment of FIG. 1 in which the lock bar 6 is coupled to the housing because the torque feature 10 is trapped in the pocket 7.

Figure 5:
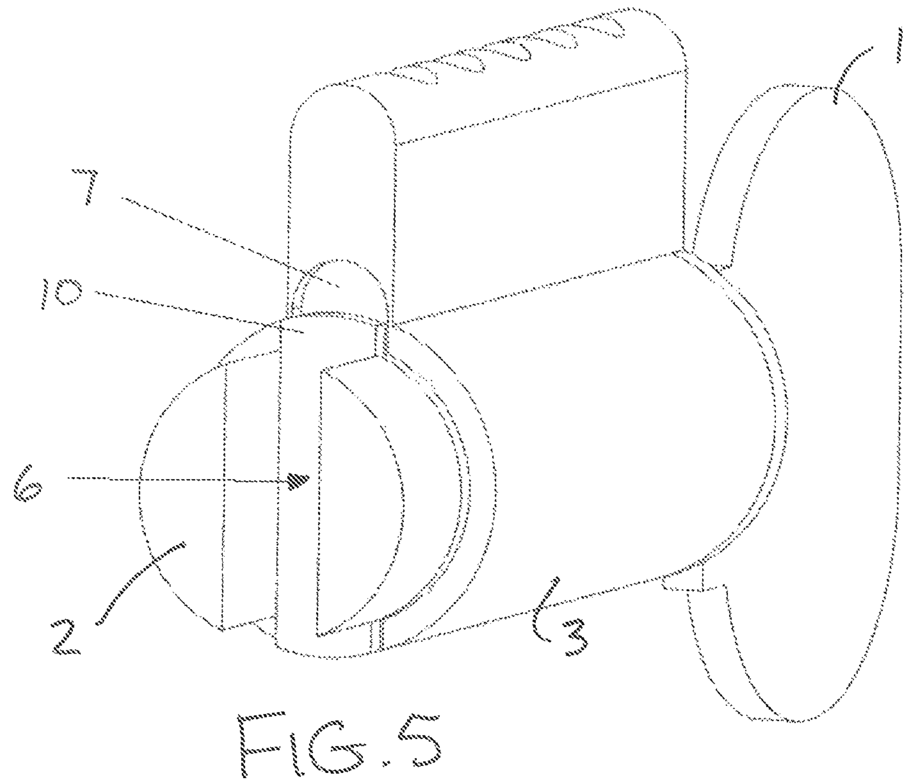
FIG. 5 illustrates the core locking mechanism in a rear isometric view in an unlocked state.

FIG. 5 illustrates the high security locking according to the first embodiment of FIG. 1 in which the lock bar 6 is uncoupled from the housing because the torque feature 10 is translated out of the pocket 7.

Figure 6:
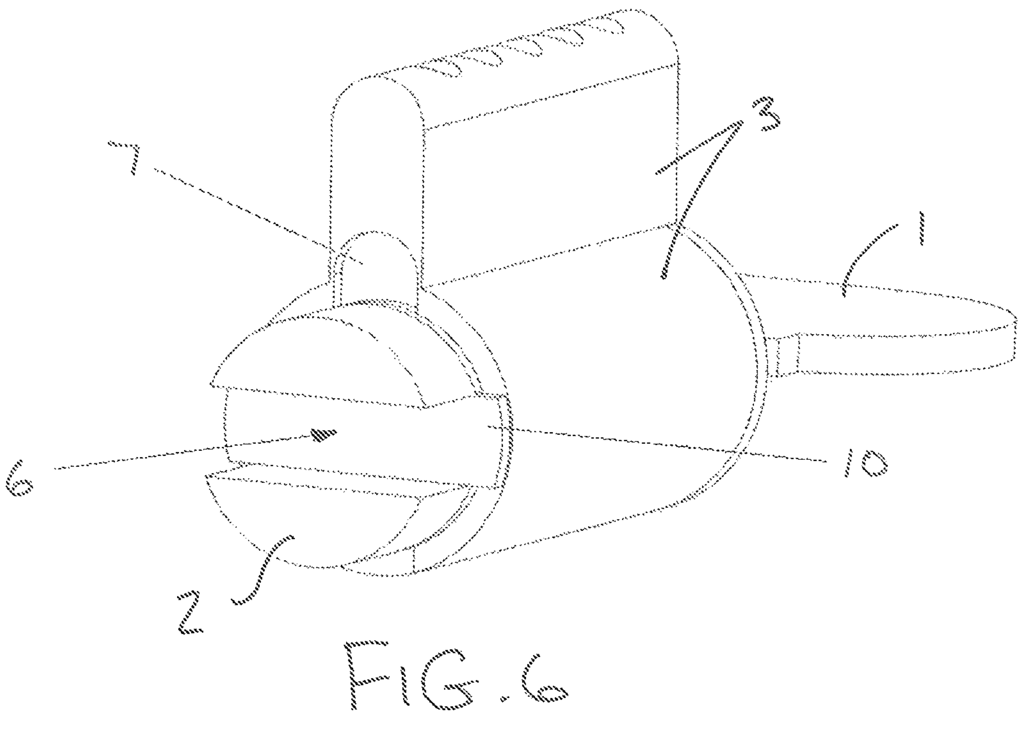
FIG. 6 illustrates the core locking mechanism in a rear isometric view in an unlocked state and the lock core has been rotated.

FIG. 6 illustrates the high security locking according to the first embodiment of FIG. 1 in which the lock bar 6 is uncoupled from the housing because the torque feature 10 is translated out of the pocket 7 and the cylinder is being rotated.

Figure 7A:
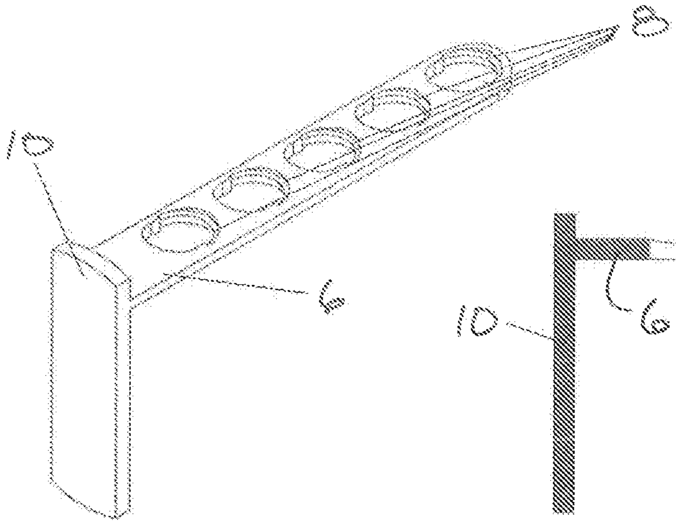
FIGS. 7A and 7B show perspective and cross section views respectively for the locking bar outside of the assembly for better detail.
Figure 7B:
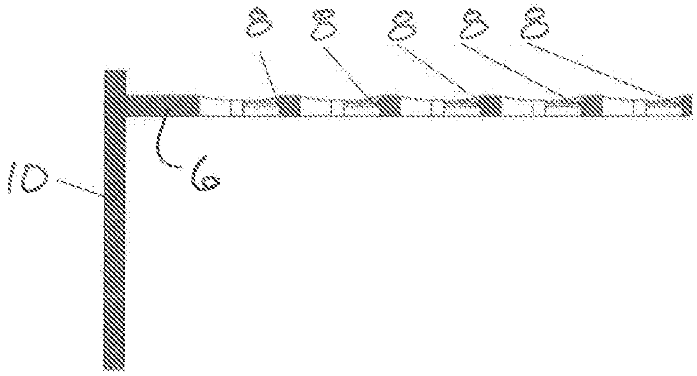

FIG. 7A illustrates the main features of the lock bar according to the first embodiment of FIG. 1 and FIG. 7B shows a sectional view of the lock bar in which the pins are trapped using a semicircular thread like feature which engages the female thread form or serration on the mating pin. In this manner, (i) the slider includes a first interlocking feature formed thereon for engaging at least one of the pins in the pin locking position of the slider, and each pin includes a plurality of second interlocking features formed thereon at spaced apart positions along a length of the pin, in which each second interlocking feature is arranged to be interlocked with the first interlocking feature at a respective longitudinal position of the pin relative to the lock cylinder to resist movement of the pin relative to the lock cylinder. Furthermore, the torque feature on the slider that is arranged to be interlocked with a corresponding feature on the lock housing in the cylinder locking position to isolate the pins from the torque applied to the lock cylinder, is further arranged to be slidable relative to the lock housing together with the slider.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A high security locking system comprising:

a key;

a lock housing;

a lock cylinder supported by the lock housing for rotation about a lock axis responsive to a torque applied to the lock cylinder;

a plurality of pins operatively associated with the lock housing and the lock cylinder for engagement by the key when the key is inserted into the lock housing for movement of the pins relative to the lock cylinder and the lock housing between a locked position blocking rotation of the lock cylinder relative to the lock housing and an unlocked position in which rotation of the lock cylinder relative to the lock housing is uninhibited by the pins;

a slider operatively associated with the lock housing and the lock cylinder for movement relative to the lock cylinder and the lock housing between La a cylinder locking position of the slider blocking rotation of the lock cylinder relative to the lock housing so as to isolate the pins from the torque applied to the lock cylinder while allowing the pins to be displaced between the locked and unlocked positions thereof and ii a pin locking position of the slider in which the pins are resisted from movement relative to the lock housing and the lock cylinder by the slider while rotation of the lock cylinder relative to the lock housing is uninhibited by the slider;

wherein the slider includes a first interlocking feature formed thereon for engaging at least one of the pins in the pin locking position of the slider; and wherein said at least one of the pins includes a plurality of second interlocking features formed thereon at spaced apart positions along a length of the pin, in which each second interlocking feature is arranged to be interlocked with the first interlocking feature at a respective longitudinal position of the pin relative to the lock cylinder to resist movement of the pin relative to the lock cylinder.

2. The system according to claim 1 further comprising:

the slider occupying an intermediate position as the slider is displaced between the cylinder locking position and the pin locking position in which (i) the slider blocks rotation of the lock cylinder relative to the lock housing so as to isolate the pins from the torque applied to the lock cylinder and (ii) the pins are resisted from movement relative to the lock housing and the lock cylinder by the slider in the intermediate position;

whereby the pins are resisted from movement prior to the rotation of the lock cylinder being uninhibited by the slider as the slider is displaced from the cylinder locking position to the pin locking position.

3. The system according to claim 1 wherein the slider is slidable relative to the lock cylinder along an axis oriented parallel to the lock axis.

4. The system according to claim 1 wherein the slider is movable relative to the lock cylinder from the cylinder locking position to the pin locking position responsive to insertion of a key into the lock housing.

5. The system according to claim 1 wherein the slider includes a torque feature arranged to be interlocked with a corresponding feature on the lock housing in the cylinder locking position to isolate the pins from the torque applied to the lock cylinder, the torque feature being slidable relative to the lock housing together with the slider.

6. The system according to claim 5 wherein the corresponding feature on the lock housing comprises a pocket receiving the torque feature of the slider therein in the cylinder locking position.

7. The system according to claim 1 wherein the slider includes a plurality of the first interlocking features formed thereon in association with respective ones of the pins and wherein each pin includes a plurality of the second interlocking features formed thereon.

* * * * *